(12) United States Patent
Lu et al.

(10) Patent No.: US 10,653,122 B2
(45) Date of Patent: May 19, 2020

(54) WATERLESS KEEP-ALIVE APPARATUS AND REFRIGERATION APPLIANCE PROVIDED WITH THE WATERLESS KEEP-ALIVE APPARATUS

(71) Applicant: QINGDAO HAIER JOINT STOCK CO., LTD., Qingdao, Shandong Province (CN)

(72) Inventors: Riyong Lu, Qingdao (CN); Jing Wang, Qingdao (CN)

(73) Assignee: QINGDAO HAIER JOINT STOCK CO., LTD., Qingdao, Shangdong Province (CN)

( * ) Notice: Subject to any disclaimer, the term of this patent is extended or adjusted under 35 U.S.C. 154(b) by 435 days.

(21) Appl. No.: 15/523,403

(22) PCT Filed: Aug. 28, 2015

(86) PCT No.: PCT/CN2015/088420
§ 371 (c)(1),
(2) Date: Apr. 30, 2017

(87) PCT Pub. No.: WO2016/110118
PCT Pub. Date: Jul. 14, 2016

(65) Prior Publication Data
US 2017/0303515 A1 Oct. 26, 2017

(30) Foreign Application Priority Data
Jan. 7, 2015 (CN) .......................... 2015 1 0006487

(51) Int. Cl.
*A01K 63/02* (2006.01)
*F25D 23/12* (2006.01)
(Continued)

(52) U.S. Cl.
CPC ............ *A01K 63/02* (2013.01); *A01K 63/065* (2013.01); *B65D 81/18* (2013.01); *F25D 17/04* (2013.01);
(Continued)

(58) Field of Classification Search
CPC ...... A01K 63/02; A01K 63/065; B65D 81/18; F25D 17/04; F25D 25/025; F25D 31/006; F25D 23/12; F25D 2331/804
See application file for complete search history.

(56) References Cited

U.S. PATENT DOCUMENTS 2,143,187 A * 1/1939 Coulter ................. F25D 17/042
62/62
2,302,336 A * 11/1942 MacDonald ........... A01K 63/02
119/214
(Continued)

FOREIGN PATENT DOCUMENTS

CN 1146240 A 3/1997
CN 1989384 A 6/2007
(Continued)

*Primary Examiner* — Ljiljana V. Ciric
(74) *Attorney, Agent, or Firm* — Cheng-Ju Chiang (57) ABSTRACT

The present invention provides a waterless keep-alive apparatus and a refrigeration appliance having the same. The waterless keep-alive apparatus is provided in an inner tank of a refrigeration appliance, and comprises: a keep-alive box allowing pulling inward and outward; a temperature controlling module and a humidity controlling module which are connected with the keep-alive box; and an air controlling module having an air hole provided on a side wall of the keep-alive box and an air duct fixed on the inner tank of the refrigeration appliance. The air duct is hermetically connected with the air hole when the keep-alive box is pushed into the inner tank of the refrigeration appliance. The air duct is disconnected from the air hole when the keep-alive box is pulled out. The waterless keep-alive apparatus realizes con- (Continued)

venient article fetching while the oxygen concentration in the keep-alive box can meet the survival needs of aquatic products.

18 Claims, 6 Drawing Sheets

(51) Int. Cl.
*A01K 63/06* (2006.01)
*B65D 81/18* (2006.01)
*F25D 17/04* (2006.01)
*F25D 25/02* (2006.01)
*F25D 31/00* (2006.01)

(52) U.S. Cl.
CPC ........... *F25D 23/12* (2013.01); *F25D 25/025* (2013.01); *F25D 31/006* (2013.01); *F25D 2331/804* (2013.01)

(56) References Cited

U.S. PATENT DOCUMENTS

| | | | | |
|---|---|---|---|---|
| 2,594,474 | A * | 4/1952 | McGrath | A01K 63/065 119/262 |
| 2,726,018 | A * | 12/1955 | Burden | B67D 1/06 222/190 |
| 2,772,867 | A * | 12/1956 | Cleckner | A01K 63/042 261/77 |
| 3,148,476 | A * | 9/1964 | Ethridge | A01K 63/02 43/55 |
| 3,191,337 | A * | 6/1965 | Fant | A01K 97/05 43/57 |
| 3,217,444 | A * | 11/1965 | Howard | A01K 97/05 43/57 |
| 3,367,061 | A * | 2/1968 | Primmer | A01K 63/02 43/55 |
| 3,401,671 | A * | 9/1968 | Axelrod | A01K 63/02 119/203 |
| 3,584,602 | A * | 6/1971 | Stasio | A01K 61/17 119/252 |
| 3,687,111 | A * | 8/1972 | Epper | A01K 63/02 119/201 |
| 3,710,502 | A * | 1/1973 | Bracey | A01K 63/02 43/56 |
| 3,831,310 | A * | 8/1974 | Frangullie | A01K 97/05 43/56 |
| 4,040,200 | A * | 8/1977 | Tomita | A01K 63/02 43/57 |
| 4,089,298 | A * | 5/1978 | Wilson | A01K 63/02 119/201 |
| 4,151,810 | A * | 5/1979 | Wiggins | A01K 63/065 119/262 |
| 4,168,590 | A * | 9/1979 | Beshoner, Sr. | A01K 63/02 43/55 |
| 4,428,145 | A * | 1/1984 | Wheeler | A01K 63/00 43/55 |
| 4,455,966 | A * | 6/1984 | Knowles | A01K 63/02 119/203 |
| 4,502,295 | A * | 3/1985 | Toledo-Pereyra | A01N 1/02 62/306 |
| 4,677,785 | A * | 7/1987 | Lambourn | A01K 97/05 261/121.2 |
| 4,712,327 | A * | 12/1987 | Ross, Sr. | A01K 63/02 43/57 |
| 4,757,636 | A * | 7/1988 | Lambourn | A01K 97/05 43/57 |
| 4,815,411 | A * | 3/1989 | Burgess | A01K 63/02 114/255 |
| 4,844,012 | A * | 7/1989 | Jerrett | G02B 6/4401 119/203 |
| 4,860,555 | A * | 8/1989 | Bishop | A23B 7/05 62/376 |
| 4,945,672 | A * | 8/1990 | Raia | A01K 97/05 261/121.2 |
| 5,010,681 | A * | 4/1991 | Cox, Jr. | A01K 63/02 261/121.2 |
| 5,117,777 | A * | 6/1992 | Takasugi | A01K 63/02 119/203 |
| 5,138,975 | A * | 8/1992 | Walsh | A01K 63/02 119/203 |
| 5,157,930 | A * | 10/1992 | McGhee | A01N 1/02 62/306 |
| 5,165,361 | A * | 11/1992 | Beghini | A01K 63/02 119/201 |
| 5,172,511 | A * | 12/1992 | Smith | A01K 63/02 261/121.2 |
| 5,212,902 | A * | 5/1993 | Moorhead | A01K 63/02 43/54.1 |
| 5,220,880 | A * | 6/1993 | Alworth | A01K 63/02 119/203 |
| 5,237,959 | A * | 8/1993 | Bergeron | A01K 63/02 119/201 |
| 5,267,410 | A * | 12/1993 | Peyatt | A01K 97/05 43/57 |
| 5,309,868 | A * | 5/1994 | Tomiyama | A01K 63/02 119/203 |
| 5,310,427 | A * | 5/1994 | Manome | A01K 63/02 119/201 |
| 5,372,084 | A * | 12/1994 | Mallory | A01K 63/02 114/255 |
| 5,377,622 | A * | 1/1995 | Lauttenbach | A01K 63/00 119/200 |
| 5,417,080 | A * | 5/1995 | Bishop | A23B 7/00 312/402 |
| RE35,895 | E * | 9/1998 | Bass, Jr. | A01K 63/02 119/203 |
| 5,799,435 | A * | 9/1998 | Stafford | A01K 97/05 261/121.2 |
| 5,921,017 | A * | 7/1999 | Clark | A01K 97/05 43/56 |
| 6,003,329 | A * | 12/1999 | Stanton, Jr. | A01K 97/05 43/54.1 |
| 6,058,714 | A * | 5/2000 | Takasugi | B60H 1/32 62/384 |
| 6,220,051 | B1 * | 4/2001 | Takasugi | B60H 1/3202 62/530 |
| 6,640,749 | B1 * | 11/2003 | Monnier | A01K 63/02 119/201 |
| 7,024,814 | B1 * | 4/2006 | McDougle | A01K 63/045 119/226 |
| 7,275,395 | B1 * | 10/2007 | Ventura | C01B 32/55 62/602 |
| 7,934,471 | B2 * | 5/2011 | Ford | A01K 63/003 119/246 |
| 8,572,889 | B1 * | 11/2013 | Hughes | A01K 97/05 43/56 |
| 8,925,487 | B2 * | 1/2015 | Kong | A01K 63/045 119/203 |
| 9,345,238 | B1 * | 5/2016 | Higginbotham | A01K 97/05 |
| 2003/0061938 | A1 * | 4/2003 | Kunstadt | A23L 3/3418 96/4 |
| 2003/0115892 | A1 * | 6/2003 | Fu | F25D 17/042 62/187 |
| 2003/0150394 | A1 * | 8/2003 | Wolfe | A01K 63/003 119/246 |
| 2004/0118359 | A1 | 6/2004 | Badell | |
| 2004/0149145 | A1 * | 8/2004 | Harris | A01K 63/02 99/467 |
| 2005/0031770 | A1 * | 2/2005 | Knauf | A22B 3/083 426/643 |
| 2005/0076848 | A1 * | 4/2005 | Lyngstad | A01K 63/02 119/203 |
| 2005/0077306 | A1 * | 4/2005 | Jackson | A45C 13/345 220/782 |
| 2005/0183431 | A1 * | 8/2005 | Rabal | A01K 63/02 62/185 |
| 2005/0284417 | A1 * | 12/2005 | Jezl | A01K 13/00 119/850 |

(56) References Cited

U.S. PATENT DOCUMENTS

| | | | |
|---|---|---|---|
| 2007/0022966 A1* | 2/2007 | Torring | A01K 63/02 119/201 |
| 2007/0068063 A1* | 3/2007 | Simpson | A01K 63/02 43/57 |
| 2007/0113565 A1* | 5/2007 | Evans | F25D 17/042 62/176.1 |
| 2007/0186836 A1* | 8/2007 | Tipton | A01K 63/02 114/255 |
| 2007/0221225 A1* | 9/2007 | Kutt | A61M 16/0045 128/205.26 |
| 2008/0006041 A1* | 1/2008 | Nakata | F25D 17/042 62/131 |
| 2008/0017045 A1* | 1/2008 | McGuire | B01D 53/02 99/323 |
| 2008/0028667 A1* | 2/2008 | Grzybowski | A01K 63/02 43/57 |
| 2009/0044757 A1* | 2/2009 | Day | A01K 63/02 119/201 |
| 2009/0107410 A1* | 4/2009 | Kania | A01K 63/006 119/246 |
| 2009/0120853 A1* | 5/2009 | Vento | A01K 63/02 210/130 |
| 2009/0255479 A1* | 10/2009 | Boudreau | A01K 63/02 119/202 |
| 2010/0043455 A1* | 2/2010 | Kuehl | F25D 11/006 62/56 |
| 2010/0058992 A1* | 3/2010 | Miyake | A01K 63/003 119/252 |
| 2010/0206240 A1* | 8/2010 | Vento | A01K 61/10 119/247 |
| 2010/0243767 A1* | 9/2010 | Mori | A23L 3/375 239/691 |
| 2011/0126775 A1* | 6/2011 | Seltzer | A01K 1/0236 119/496 |
| 2011/0204762 A1* | 8/2011 | Eubanks | F25D 17/042 312/404 |
| 2012/0079990 A1* | 4/2012 | Fuhr | A01N 1/00 119/201 |
| 2012/0311926 A1* | 12/2012 | Mittelmark | F24F 3/16 47/17 |
| 2013/0305605 A1* | 11/2013 | Wang | A01K 63/065 47/66.6 |
| 2015/0122182 A1* | 5/2015 | Aldana | A01K 67/033 119/6.6 |
| 2015/0335038 A1* | 11/2015 | Biotti | A23B 7/055 422/29 |
| 2015/0354884 A1* | 12/2015 | Met | F25D 23/12 62/132 |
| 2016/0238304 A1* | 8/2016 | Gunduz | F25D 23/087 |
| 2017/0027137 A1* | 2/2017 | Fagiano | A01K 63/02 |
| 2017/0223936 A1* | 8/2017 | Fagiano | A01K 63/065 |
| 2017/0223941 A1* | 8/2017 | Cornwell | A01K 97/05 |
| 2017/0251643 A1* | 9/2017 | Boudreau | B65D 21/0233 |
| 2017/0305804 A1* | 10/2017 | Ayers | C05F 11/08 |
| 2018/0299144 A1* | 10/2018 | Carballo | F25D 17/042 |

FOREIGN PATENT DOCUMENTS

| | | |
|---|---|---|
| CN | 201700258 U | 1/2011 |
| CN | 102084841 A | 6/2011 |
| CN | 202456117 U | 10/2012 |
| CN | 203555038 U | 4/2014 |
| CN | 104521864 A | 4/2015 |
| JP | S64-16540 A | 1/1989 |
| JP | H8-103187 A | 4/1996 |
| KR | 10-2010-0010477 A | 2/2010 |

* cited by examiner

WATERLESS KEEP-ALIVE APPARATUS AND REFRIGERATION APPLIANCE PROVIDED WITH THE WATERLESS KEEP-ALIVE APPARATUS

CROSS REFERENCE TO RELATED APPLICATIONS

The present application is a 35 U.S.C. § 371 National Phase conversion of International (PCT) Patent Application No. PCT/CN2015/088420, filed on Aug. 28, 2015, which claims the priority of the Chinese patent application No. 201510006487.9 filed on Jan. 7, 2015 and with the title of "Waterless keep-alive apparatus and refrigeration appliance provided with the Waterless keep-alive apparatus", which is incorporated herein in its entirety as reference. The PCT International Patent Application was filed and published in Chinese.

The present application claims the priority of the Chinese patent application No. 201510006487.9 filed on Jan. 7, 2015 and with the title of "Waterless keep-alive apparatus and refrigeration appliance provided with the Waterless keep-alive apparatus", which is incorporated herein in its entirety as reference.

TECHNICAL FIELD

The present invention is related to a waterless keep-alive apparatus and refrigeration appliance provided with the Waterless keep-alive apparatus.

BACKGROUND

A refrigerator is mainly used for refrigerating and freezing food at low temperatures so that the food has a longer storage life. Aquatic products such as fish, shrimps and shellfish need to live in water, so an existing container for storing the aquatic products needs to be filled with water and to add oxygen into the water to satisfy survival conditions of the aquatic products as well. With the rapid development of technology, it becomes more and more favorable for users to place the aquatic products such as fish, shrimps and shellfish into the refrigerator and keep them alive. Furthermore, it appears an important development trend to place the aquatic products such as fish, shrimps and shellfish into a waterless container in the refrigerator and keep the aquatic products such as fish, shrimps and shellfish alive.

For the above aquatic products, oxygen is also essential. However, oxygen concentration in an existing waterless keep-alive apparatus usually cannot satisfy the survival needs of the aquatic products, so that the survival time of the aquatic products in the waterless keep-alive apparatus is relatively short. In the meanwhile, in an existing waterless keep-alive apparatus, an air inlet and an air outlet are fixedly connected with an air intake tube and an air exhaust tube respectively. As a result, when fetching a stored article from the waterless keep-alive apparatus, people can only open a door body at the front side of the waterless keep-alive apparatus, while it is inconvenient to fetch a stored article at the inner side of the waterless keep-alive apparatus.

In view of this, it is necessary to improve the existing waterless keep-alive apparatus to solve the above-mentioned problems.

SUMMARY

This invention aims to provide a waterless keep-alive apparatus which not only allows the aquatic products such as fish, shrimps and shellfish to survive for longer time in a waterless environment but also allows convenient article fetching.

In order to realize the above purpose, this invention provides a waterless keep-alive apparatus provided in an inner tank of a refrigeration appliance. The waterless keep-alive apparatus comprises: a keep-alive box allowing pulling inward and outward; a temperature controlling module and a humidity controlling module which are connected with the keep-alive box; and an air controlling module. The air controlling module comprises an air hole provided on a side wall of the keep-alive box and an air duct fixed on the inner tank of the refrigeration appliance. The air duct is hermetically connected with the air hole when the keep-alive box is pushed into the inner tank of the refrigeration appliance. The air duct is disconnected from the air hole when the keep-alive box is pulled out.

As a further improvement of this invention, the air hole includes an air inlet and an air outlet, and the air duct includes an air intake duct and an air exhaust duct. When the keep-alive box is pushed into the inner tank of the refrigeration appliance, the air intake duct and the air exhaust duct are hermetically connected with the air inlet and the air outlet respectively. When the keep-alive box is pulled out, the air intake duct and the air exhaust duct are respectively disconnected from the air inlet and the air outlet respectively.

As a further improvement of this invention, both the air inlet and the air outlet are provided on the same side wall of the keep-alive box, and a setting position of the air inlet is higher than a setting position of the air outlet in a vertical direction.

As a further improvement of this invention, the air inlet and the air outlet are disposed along a diagonal line on the same side wall of the keep-alive box.

As a further improvement of this invention, a protruding block extending along a direction of pulling the keep-alive box is provided at a location corresponding to the air outlet in the keep-alive box, a through slot penetrating through the protruding block is provided in the protruding block, and the through slot communicates with the air outlet to facilitate discharge of gas in the keep-alive box slot As a further improvement of this invention, the air outlet is provided on a rear wall of the keep-alive box, the protruding block extends from the rear wall of the keep-alive box to a front side of the keep-alive box, and the through slot is provided at the front side of the keep-alive box.

As a further improvement of this invention, the air duct comprises a fixing portion fixed on the inner tank of the refrigeration appliance and a docking portion extending outward from an end of the fixing portion so as to dock with the air hole, and a diameter of the docking portion is decreased gradually from the end of the fixing portion so that a cross-section of the air duct roughly has a bullet shape.

As a further improvement of this invention, a connecting portion whose diameter is larger than a diameter of the fixing portion protrudes at a location close to the fixing portion on the docking portion, the air duct further comprises a sealing member clamped on the connecting portion and a part of the docking portion so as to hermetically connect the air hole and the air duct when docking with the air hole, and a receiving slot is provided in the sealing member for receiving the connecting portion.

As a further improvement of this invention, a groove is formed at an outer side of the sealing member by depression so as to receive an inner side wall of the air hole when hermetically connecting the air hole.

This invention also aims to provide a refrigeration appliance which not only allows the aquatic products such as fish, shrimps and shellfish to survive for longer time in a waterless environment but also allows convenient article fetching.

In order to realize the above purpose, this invention provides a refrigeration appliance which comprises an inner tank provided with the foregoing waterless keep-alive apparatus therein.

The beneficial effects of this invention are as follows. According to the waterless keep-alive apparatus of this invention, the air hole is provided on the side wall of the keep-alive box, the air duct is fixed on the inner tank of the refrigeration appliance, the air duct is hermetically connected with the air hole when the keep-alive box is pushed into the inner tank of the refrigeration appliance, and the air duct is disconnected from the air hole when the keep-alive box is pulled out, so that the waterless keep-alive apparatus of this invention can realize convenient article fetching by pulling the keep-alive box.

DETAILED DESCRIPTION

In order to make the purposes, technical solutions and advantages of this invention more clear, specific embodiments of this invention are described in accompany with the drawings as follows.

A refrigeration appliance includes a refrigerator, a freezer and some other appliance for refrigerating and freezing food at low temperature so as to realize a longer storage life for the food. The following description of this invention is given by taking a refrigerator for example.

Figure 1:
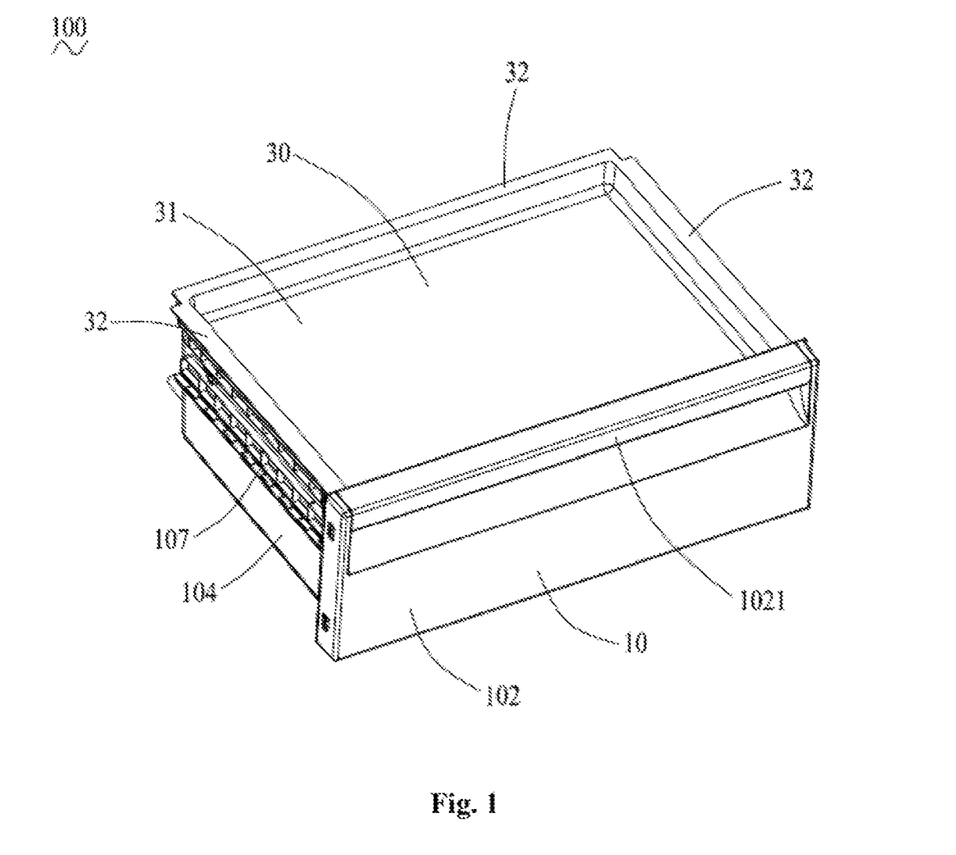
FIG. 1 is a stereogram illustrating a waterless keep-alive apparatus of this invention.
Figure 2:
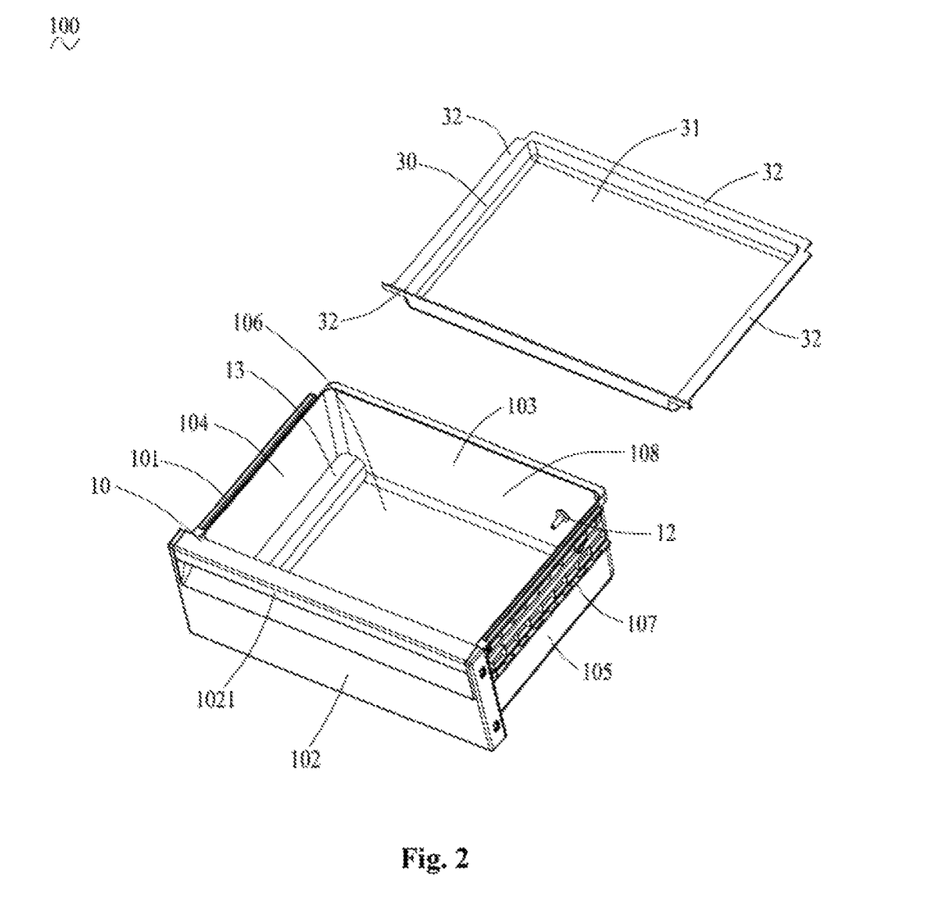
FIG. 2 is a decomposition diagram illustrating the waterless keep-alive apparatus of FIG. 1.

As shown in FIG. 1 and FIG. 2, a refrigerator of this invention comprises: a box body for storing articles, and a door body for opening and closing the box body. An inner tank of the refrigerator is provided in the box body. An independent waterless keep-alive apparatus 100 is provided in the inner tank of the refrigerator. The waterless keep-alive apparatus 100 is used for storing aquatic products such as fish, shrimps and shellfish.

The waterless keep-alive apparatus 100 comprises: a keep-alive box 10 allowing pulling inward and outward, for storing the aquatic products and keeping the same alive; a cover body 30 on the keep-alive box 10 for sealing and covering the keep-alive box 10; and a temperature controlling module, a humidity controlling module and an air controlling module which are connected with the keep-alive box 10. The temperature controlling module is used for detecting in real time and controlling the temperature in the keep-alive box 10. The humidity controlling module is used for detecting in real time and controlling the humidity in the keep-alive box 10. The air controlling module is used for detecting in real time and controlling the oxygen concentration in the keep-alive box 10. As such, the particular survival circumstance of the foregoing aquatic products is satisfied. Both the temperature controlling module and the humidity controlling module pertain to the prior art and are not detailed.

Figure 3:
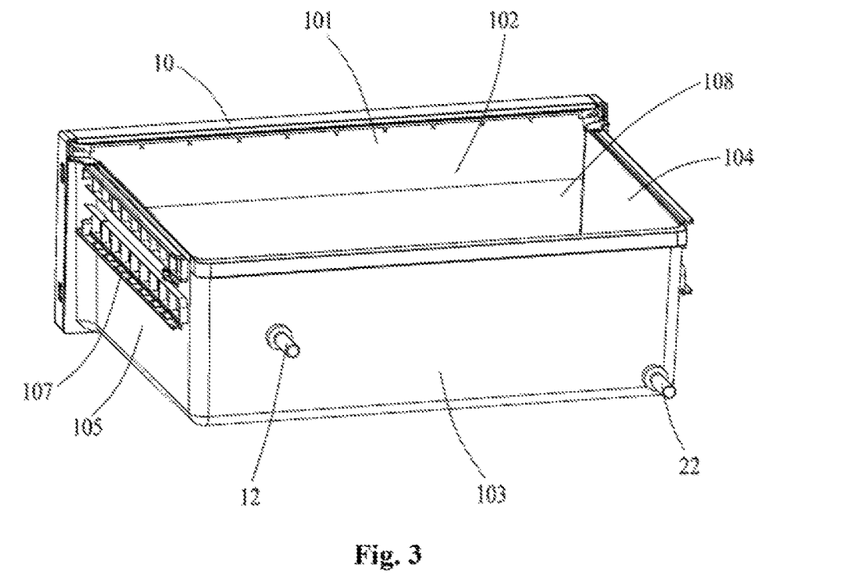
FIG. 3 is a stereogram illustrating a hermetical connection between a keep-alive box and an air duct of FIG. 2.
Figure 4:
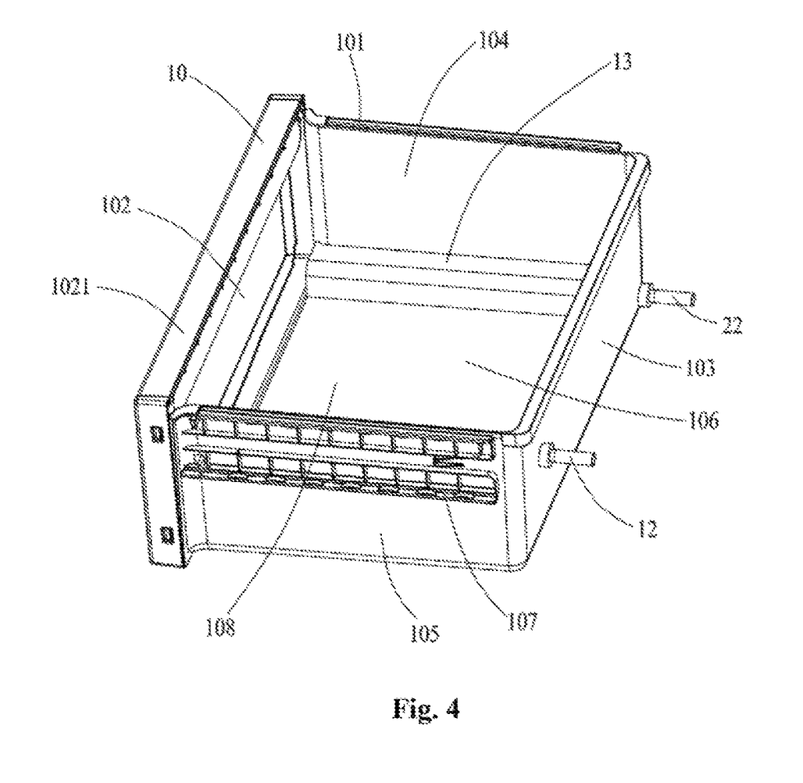
FIG. 4 is a stereogram illustrating another view angle of FIG. 3.
Figure 5:
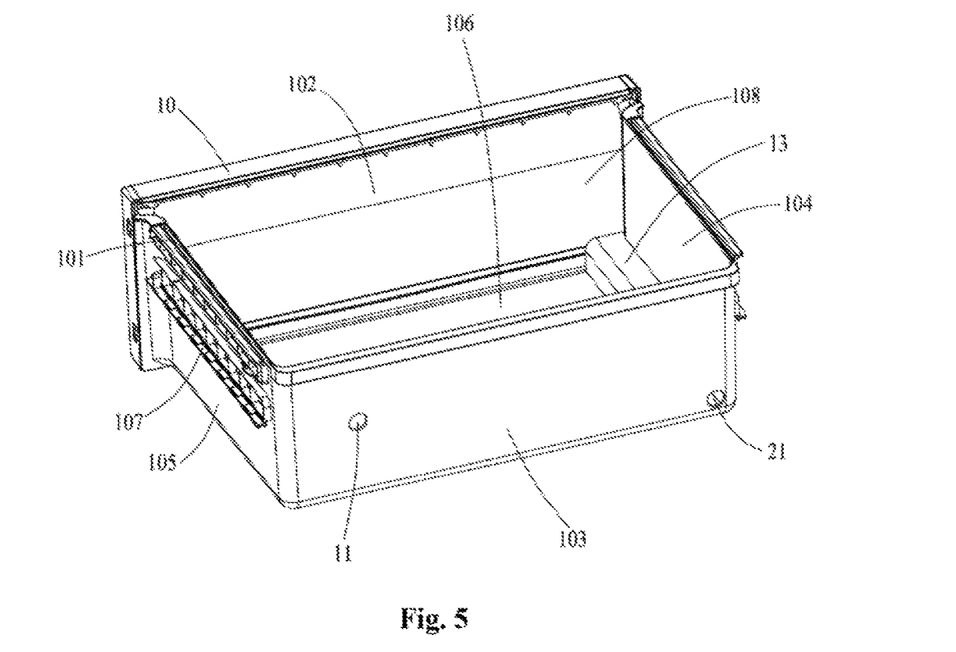
FIG. 5 is an independent stereogram illustrating a keep-alive box of FIG. 4.

As shown in FIG. 3 to FIG. 5, the air controlling module comprises: an air hole provided on a side wall of the keep-alive box 10; and an air duct fixed on the inner tank of the refrigerator. When the keep-alive box 10 is pushed into the inner tank of the refrigerator, the air duct is hermetically connected with the air hole. When the keep-alive box 10 is pulled out, the air duct is disconnected from the air hole. The air hole includes an air inlet 11 and an air outlet 21. The air duct includes an air intake duct 12 and an air exhaust duct 22. When the keep-alive box 10 is pushed into the inner tank of the refrigerator, the air intake duct 12 and the air exhaust duct 22 are hermetically connected with the air inlet 11 and the air outlet 21 respectively. When the keep-alive box 10 is pulled out, the air intake duct 12 and the air exhaust duct 22 are disconnected from the air inlet 11 and the air outlet 21 respectively.

Both the air inlet 11 and the air outlet 21 are provided on the same side wall of the keep-alive box 10, and a setting position of the air inlet 11 is higher than a setting position of the air outlet 21 in a vertical direction. In this embodiment, the air inlet 11 and the air outlet 21 are disposed along a diagonal line on the same side wall of the keep-alive box 10. The air intake duct 12 is connected with an oxygen supplying device to supply oxygen into the keep-alive box 10. The air exhaust duct 22 is connected with an air exhaust device to discharge unwanted gas in the keep-alive box 10.

The keep-alive box 10 is arranged in a drawer shape, comprising: a top opening 101; a front wall 102 and a rear wall 103 disposed opposite to each other; a left side wall 104 and a right side wall 105 disposed opposite to each other; and a bottom wall 106 disposed opposite to the top opening 101. A handle 1021 allowing pulling the keep-alive box 10 forward and backward is provided on the front wall 102. A sliding rail 107 is respectively provided on the left side wall 104 and the right side wall 105. Accordingly, a slide way (not shown in drawings) is provided on the inner tank of the refrigerator. As such, by cooperation between the sliding rail 107 and the slide way, the keep-alive box 10 can be pulled forward and backward in the inner tank of the refrigerator.

The front wall 102, the rear wall 103, the left side wall 104, the right side wall 105 and the bottom wall 106 enclose together to form a receiving space 108 for receiving the foregoing aquatic products such as fish, shrimps and shellfish. In this embodiment, the rear wall 103, the left side wall 104, the right side wall 105 and the bottom wall 106 are given by integral forming. Both sides of the front wall 102 are respectively fixed with an end of the left side wall 104 and that of the right side wall 105 by clamping. Of course, the front wall 102, the rear wall 103, the left side wall 104, the right side wall 105 and the bottom wall 106 may also be provided by integral forming.

Both the air inlet 11 and the air outlet 21 are provided on the rear wall 103. The air inlet 11 is provided on an upper left corner of the rear wall 103. The air outlet 21 is provided on a lower right corner of the rear wall 103. In this way, the air inlet 11 and the air outlet 21 is disposed along a diagonal line on the rear wall 103. A protruding block 13 extending along a direction of pulling the keep-alive box 10 is provided at a location corresponding to the air outlet 21 in the keep-alive box 10. The protruding block 13 extends from the rear wall 103 of the keep-alive box 10 to a front side of the keep-alive box 10 (i.e., a location near the front wall 102). A through slot (not shown in drawings) penetrating through the protruding block 13 is provided in the protruding block 13. The through slot communicates with the air outlet 21. The through slot is provided at the front side of the keep-alive box 10. As such, unwanted gas (e.g., carbon dioxide) in the keep-alive box 10 can be discharged out of the keep-alive box 10 through the through slot and the air exhaust duct 22. In addition, when the oxygen supplying device adds oxygen into the keep-alive box 10 via the air intake duct 12, it can prevent the oxygen from being discharged out of the keep-alive box 10 together with other unwanted gas.

Of course, the keep-alive box 10 may not be provided with the protruding block 13; instead, the air exhaust duct 22 may be directly inbuilt in the left side wall 104 or the bottom wall 106 of the keep-alive box 10, and then an air outlet (not shown in drawings) is provided at a front side of the bottom wall 106. As such, the unwanted gas in the keep-alive box 10 can be discharged out of the keep-alive box 10 through the air outlet and the air exhaust duct 22.

Figure 6:
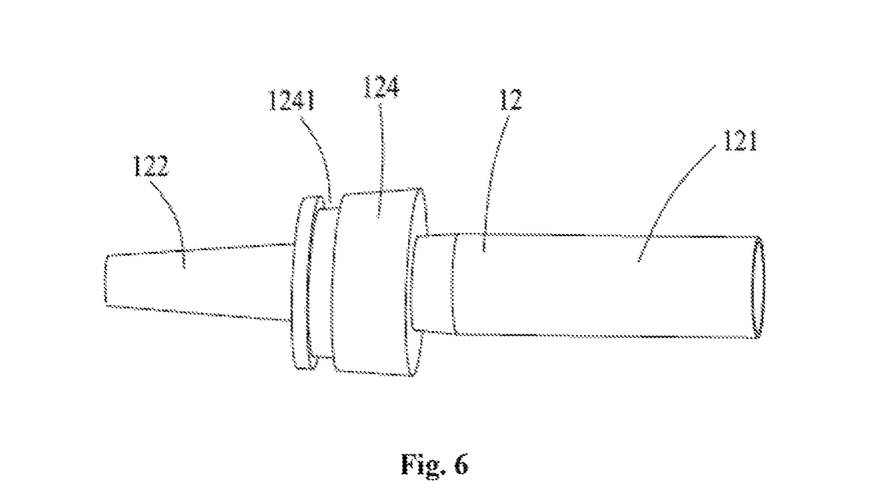
FIG. 6 is an independent stereogram illustrating an air duct of FIG. 4.
Figure 7:
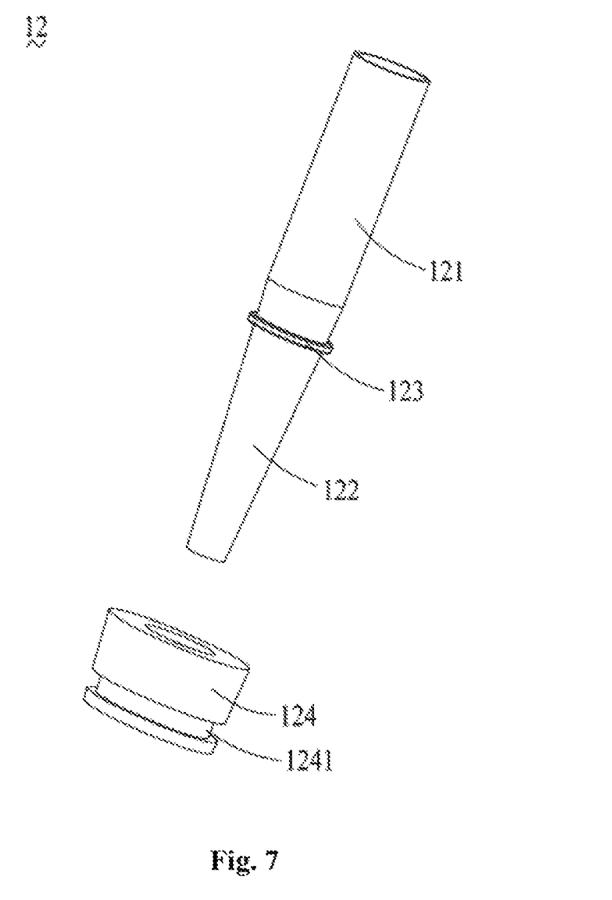
FIG. 7 is a decomposition diagram illustrating an air duct of FIG. 6.

As shown in FIG. 6 and FIG. 7, the air intake duct 12 and the air exhaust duct 22 have the same structure, so the following description is detailed by taking the air intake duct 12 as an example and the structure of the air exhaust duct 22 is not detailed any more. The air intake duct 12 comprises: a fixing portion 121 fixed on the inner tank of the refrigerator; and a docking portion 122 extending outward from an end of the fixing portion 121 so as to dock with the air inlet 11. The diameter of the docking portion 122 is decreased gradually from the end of the fixing portion 121 so that a cross-section of the air intake duct 12 roughly has a bullet shape. A connecting portion 123 whose diameter is larger than the diameter of the fixing portion 121 protrudes at a location close to the fixing portion 121 on the docking portion 122.

The air intake duct 12 further comprises a sealing member 124 clamped on the connecting portion 123 and a part of the docking portion 122, so as to hermetically connect the air inlet 11 and the air intake duct 12 when docking with the air inlet 11. A receiving slot (not shown in drawings) is provided in the sealing member 124 for receiving the connecting portion 123. A groove 1241 is formed at an outer side of the sealing member 124 by depression so as to receive an inner side wall of the air inlet 11 when hermetically connecting the air inlet 11. The sealing member 124 is sleeved at the air intake duct 12 and is made of a flexible material. Of course, the sealing member 124 and the air intake duct 12 may be provided by integral forming.

As shown in FIG. 1 and FIG. 2, the cover body 30 comprises a tray-shaped covering portion 31 and an overlapping portion 32 arranged around the covering portion 31. The overlapping portion 32 corresponding to the upper parts of the rear wall 103, the left side wall 104 and the right side wall 105 extends in a horizontal direction; while a part of the overlapping portion 32 corresponding to the front wall 102 extends in a vertical direction. As such, when the keep-alive box 10 and the cover body 30 are assembled, the covering portion 31 protrudes from the top opening 101 into the receiving space 108. At the same time, the overlapping portion 32 is overlapped on an upper edge of the rear wall 103, the left side wall 104 and the right side wall 105, while the part of the overlapping portion 32 located at the side of the front wall 102 is tightly connected with the front wall 102 so as to cooperate to seal the receiving space 108. In addition, the part of the overlapping portion 32 located at the side of the front wall 102 may further play a role in limiting a further entry of the keep-alive box 10 after the keep-alive box 10 is pushed into the inner tank of the refrigerator.

When aquatic products are in a storage status, the air inlet 11 is connected with the air intake duct 12, and the air outlet 21 is connected with the air exhaust duct 22. When the aquatic products need to be accessed, the keep-alive box 10 is pulled outward to the receiving space 108 and fully exposed. At this moment, the air inlet 11 is disconnected with the air intake duct 12, and the air outlet 21 is disconnected with the air exhaust duct 22. After the aquatic products are accessed, the keep-alive box 10 is pushed into the inner tank of the refrigerator again, until the air inlet 11 and the air outlet 21 respectively restore connection with the air intake duct 12 and the air exhaust duct 22.

Figure 8:
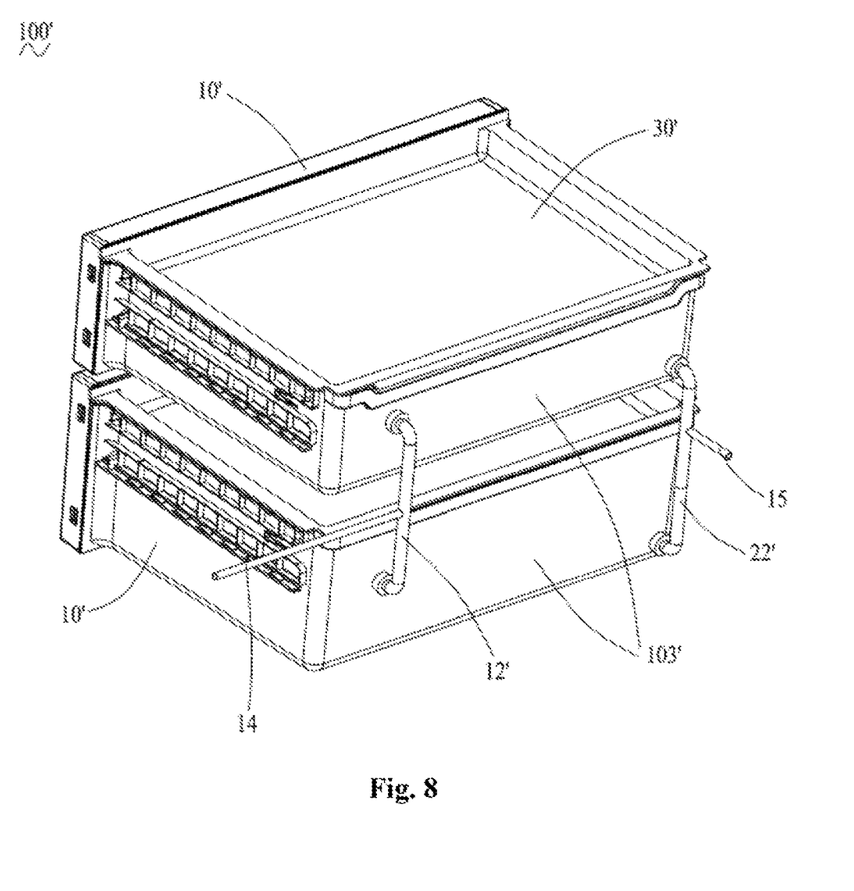
FIG. 8 is a stereogram illustrating a waterless keep-alive apparatus according to another embodiment of this invention.

FIG. 8 is a stereogram illustrating the waterless keep-alive apparatus 100 according to another embodiment of this invention. In this embodiment, the waterless keep-alive apparatus 100' comprises two keep-alive boxes 10' and two cover bodies 30', and the two keep-alive boxes 10' and the two cover bodies 30' respectively have the same structures as those of the foregoing keep-alive box 10 and cover body 30. The main difference between the waterless keep-alive apparatus 100' illustrated in FIG. 8 and the waterless keep-alive apparatus 100 illustrated in FIG. 1 lies in that the waterless keep-alive apparatus 100' illustrated in FIG. 8 is formed by the superposition of two waterless keep-alive apparatuses 100 illustrated in FIG. 1. In this embodiment, two air intake ducts 12' on the keep-alive box 10' of the waterless keep-alive apparatus 100' interconnect and communicate with each other, and two air exhaust ducts 22' also interconnect and communicate with each other. The waterless keep-alive apparatus 100' further comprises an air intake tube 14 communicated with the air intake duct 12' and an air exhaust tube 15 communicated with the air exhaust duct 22'. The air intake tube 14 is connected with the oxygen supplying device so as to supply oxygen into the keep-alive box 10'. The air exhaust tube 15 is connected with the air exhaust device so as to discharge unwanted gas in the keep-alive box 10'.

And so on, the waterless keep-alive apparatus 100, 100' of this invention may comprise multiple keep-alive boxes 10, 10' and multiple cover bodies 30, 30'. As long as the air intake ducts 12, 12' and air exhaust ducts 22, 22' of the multiple keep-alive boxes 10, 10' interconnect respectively and can realize oxygen supplying and unwanted gas discharging, no restrictions are made on it.

In conclusion, according to the waterless keep-alive apparatus 100, 100' of this invention, by providing the air inlet 11 and the air outlet 21 on the rear wall 103, 103' of the keep-alive box 10, 10' and fixing the air intake duct 12, 12' and the air exhaust duct 22, 22' to the inner tank of the refrigerator in the meantime, the air intake duct 12, 12' and the air exhaust duct 22, 22' will be hermetically connected with the air inlet 11 and the air outlet 21 when the keep-alive box 10, 10' is pushed into the inner tank of the refrigerator, and the air intake duct 12, 12' and the air exhaust duct 22, 22' will be disconnected from the air inlet 11 and the air outlet 21 when the keep-alive box 10, 10' is pulled out. Further, with the waterless keep-alive apparatus 100, 100' of this invention, it can realize convenient article fetching while the oxygen concentration in the keep-alive box 10, 10' can meet the survival needs of aquatic products.

The foregoing embodiments are merely given for illustrating the technical solutions of the present invention but not limiting the same. Although reference is made to some preferred embodiments to detail the present invention, it is to be understood by those skilled in the art that, modifications and equivalent replacements may be implemented to the technical solutions of the present invention, without breaking away from the spirit and scope of the technical solutions of the present invention.

What is claimed is:

1. A waterless keep-alive apparatus, provided in an inner tank of a refrigeration appliance and comprising:
   a keep-alive box allowing pulling inward and outward;
   a temperature controlling module and a humidity controlling module which are connected with the keep-alive box; and
   an air controlling module having an air hole provided on a side wall of the keep-alive box and an air duct fixed on the inner tank of the refrigeration appliance;
   wherein the air duct is hermetically connected with the air hole when the keep-alive box is pushed into the inner tank of the refrigeration appliance, and the air duct is disconnected from the air hole when the keep-alive box is pulled out.

2. The waterless keep-alive apparatus of claim 1, wherein the air hole includes an air inlet and an air outlet, and the air duct includes an air intake duct and an air exhaust duct, wherein the air intake duct and the air exhaust duct are hermetically connected with the air inlet and the air outlet respectively when the keep-alive box is pushed into the inner tank of the refrigeration appliance, and the air intake duct and the air exhaust duct are respectively disconnected from the air inlet and the air outlet when the keep-alive box is pulled out.

3. The waterless keep-alive apparatus of claim 2, wherein both the air inlet and the air outlet are provided on the same side wall of the keep-alive box and a setting position of the air inlet is higher than a setting position of the air outlet in a vertical direction.

4. The waterless keep-alive apparatus of claim 3, wherein the air inlet and the air outlet are disposed along a diagonal line on the same side wall of the keep-alive box.

5. The waterless keep-alive apparatus of claim 2, wherein a protruding block extending along a direction of pulling the keep-alive box is provided at a location corresponding to the air outlet in the keep-alive box, a through slot penetrating through the protruding block is provided in the protruding block, and the through slot communicates with the air outlet to facilitate discharge of air in the keep-alive box slot.

6. The waterless keep-alive apparatus of claim 5, wherein the air outlet is provided on a rear wall of the keep-alive box, the protruding block extends from the rear wall of the keep-alive box to a front side of the keep-alive box, and the through slot is provided at the front side of the keep-alive box.

7. The waterless keep-alive apparatus of claim 1, wherein:
   the air duct comprises a fixing portion fixed on the inner tank of the refrigeration appliance and a docking portion extending outward from an end of the fixing portion so as to dock with the air hole, and
   a diameter of the docking portion is decreased gradually from the end of the fixing portion so that a cross-section of the air duct roughly has a bullet shape.

8. The waterless keep-alive apparatus of claim 7, wherein:
   a connecting portion whose diameter is larger than a diameter of the fixing portion protrudes at a location close to the fixing portion on the docking portion;
   the air duct further comprises a sealing member clamped on the connecting portion and a part of the docking portion so as to hermetically connect the air hole and the air duct when docking with the air hole, and
   a receiving slot is provided in the sealing member for receiving the connecting portion.

9. The waterless keep-alive apparatus of claim 8, wherein a groove is formed at an outer side of the sealing member by depression so as to receive an inner side wall of the air hole when hermetically connecting the air hole.

10. A refrigeration appliance comprising an inner tank, a waterless keep-alive apparatus provided in the inner tank, wherein the waterless keep-alive apparatus comprises:
    a keep-alive box allowing pulling inward and outward;
    a temperature controlling module and a humidity controlling module which are connected with the keep-alive box; and
    an air controlling module having an air hole provided on a side wall of the keep-alive box and an air duct fixed on the inner tank of the refrigeration appliance;
    wherein the air duct is hermetically connected with the air hole when the keep-alive box is pushed into the inner tank of the refrigeration appliance, and the air duct is disconnected from the air hole when the keep-alive box is pulled out.

11. The refrigeration appliance of claim 10, wherein the air hole includes an air inlet and an air outlet, and the air duct includes an air intake duct and an air exhaust duct;
    wherein the air intake duct and the air exhaust duct are hermetically connected with the air inlet and the air outlet respectively when the keep-alive box is pushed into the inner tank of the refrigeration appliance, and the air intake duct and the air exhaust duct are respectively disconnected from the air inlet and the air outlet when the keep-alive box is pulled out.

12. The refrigeration appliance of claim 11, wherein both the air inlet and the air outlet are provided on the same side wall of the keep-alive box and a setting position of the air inlet is higher than a setting position of the air outlet in a vertical direction.

13. The refrigeration appliance of claim 12, wherein the air inlet and the air outlet are disposed along a diagonal line on the same side wall of the keep-alive box.

14. The refrigeration appliance of claim 11, wherein a protruding block extending along a direction of pulling the keep-alive box is provided at a location corresponding to the air outlet in the keep-alive box, a through slot penetrating through the protruding block is provided in the protruding block, and the through slot communicates with the air outlet to facilitate discharge of air in the keep-alive box slot.

15. The refrigeration appliance of claim 14, wherein the air outlet is provided on a rear wall of the keep-alive box, the protruding block extends from the rear wall of the keep-alive box to a front side of the keep-alive box, and the through slot is provided at the front side of the keep-alive box.

16. The refrigeration appliance of claim 10, wherein:
    the air duct comprises a fixing portion fixed on the inner tank of the refrigeration appliance and a docking portion extending outward from an end of the fixing portion so as to dock with the air hole, and
    a diameter of the docking portion is decreased gradually from the end of the fixing portion so that a cross-section of the air duct roughly has a bullet shape.

17. The refrigeration appliance of claim 16, wherein:
    a connecting portion whose diameter is larger than a diameter of the fixing portion protrudes at a location close to the fixing portion on the docking portion;
    the air duct further comprises a sealing member clamped on the connecting portion and a part of the docking portion so as to hermetically connect the air hole and the air duct when docking with the air hole; and a receiving slot is provided in the sealing member for receiving the connecting portion.

18. The refrigeration appliance of claim 17, wherein a groove is formed at an outer side of the sealing member by depression so as to receive an inner side wall of the air hole when hermetically connecting the air hole.

\* \* \* \* \*